March 14, 1972  B. E. BLAKESLEE ET AL  3,649,474
ELECTROFORMING PROCESS
Filed Dec. 5, 1969

INVENTORS
THADDEUS J. GAJEWSKI
BYRON E. BLAKESLEE
AKIO ISHIDA

John A. McKinney
ATTORNEY

3,649,474
ELECTROFORMING PROCESS
Byron Edward Blakeslee, South Bound Brook, Thaddeus Joseph Gajewski, Middlesex, and Akio Ishida, Berkeley Heights, N.J., assignors to Johns-Manville Corporation, New York, N.Y.
Filed Dec. 5, 1969, Ser. No. 882,594
Int. Cl. B51c 3/08; C23b 7/00
U.S. Cl. 204—6         12 Claims

ABSTRACT OF THE DISCLOSURE

Process for electroforming metal articles by (1) spraying a thin conductive coating of metal on a non-conductive male model; (2) electroplating a thin layer of metal on the coated male model; (3) applying a mold material on the electroplated layer of metal on the male model to form a female mold: (4) withdrawing the male model from the female mold which has the effect of transferring the electroplated layer and the conductive coating onto the surface of the female mold; (5) stripping the conductive coating layer from the surface of the female mold; and (6) electrodepositing a metal article in the female mold to produce an electroformed article having a surface formed by the original electroplated layer.

BACKGROUND OF THE INVENTION

This invention relates to a process for electroforming articles by providing a conductive surface on a non-conductive mold. The invention is particularly useful for electroforming articles that have surface projections characterized by high depth to width ratio, such as the metal dies used in stamping acoustic ceiling tile. While the disclosed specific embodiment of this invention is directed to the manufacture of such a die it should be understood that the process of the invention may be used in the electroforming of a variety of metal articles.

Electroforming is a technique commonly used to produce or reproduce articles by electrodeposition of a metal on a female mold. The female mold is usually prepared by pressing or casting metal, wax, or plastic materials against the surface of the original article which is to be reproduced.

In the past, if the female mold is made of a non-conductive material, such as plaster, rubber, plastic, or glass, the surface of the female mold has usually been made conductive by spraying or painting a conductive coating such as copper, gold, or silver directly onto the surface of the female mold.

It is difficult and often impossible to fully coat a female mold by the usual spraying or painting techniques if the mold contains relatively deep and narrow pointed crevices or impressions such as are often present in a female mold for producing dies for stamping acoustical ceiling tile. Ceiling tile stamping dies or "fissure plates" are designed with sharp projections or "lugs" to artificially impress a "cratered" design that simulates natural fissured ceiling tile. It is necessary to render the entire surface of the female mold conductive so that the electrochemical deposition of metal during the electroforming process will form an article having surface projections that conform to the dimensions of the mold. Unless the surface of the female mold is completely covered with conductive material at the bottom of all crevices, deposited metal will not be conducted to the bottom of the crevices during the electroforming process, and the resulting die will not possess the desired surface contours.

The rejection rate for stamping dies for acoustical tile electroformed in such female dies has thus been undesirably high. This high rejection rate has been a serious problem because of the high costs involved in making such dies.

OBJECTS OF THE INVENTION

Accordingly, it is an object of the present invention to provide an improved process for electroforming metal articles.

Another object of the invention is to provide an electroforming process that will accurately reproduce articles that possess surface projections having a high depth to width ratio, such as dies for use in stamping acoustical ceiling tile.

Still another object of the invention is to provide an electroforming process that will provide a durable finish for metallic articles which have projecting surface details.

Additional objects and advantages of this invention will be set forth in part in the description which follows, and in part will be obvious from the description, or may be learned by practice of the invention.

SUMMARY OF THE INVENTION

The invention includes a process for electroforming metal articles comprising: coating a male model of the article to be electroformed with a thin conductive coating; electroplating a thin layer of metal on the conductive coating; forming a female mold by applying mold material over the electroplated male model and curing the mold material; withdrawing the male model from the female mold while leaving the electroplated layer and a majority of the thin conductive coating on the female mold; electroforming into the metal coated female mold in order to build up the desired article to a workable thickness; and finally removing the female mold material from the electroplated layer which forms the integral surface of the desired article.

This preferred form of the invention in which an electroplated coating is transferred from an original male model to a female mold and then again transferred from the female mold to the surface of the article electroformed in the female mold, produces electroformed articles that faithfully reproduce even male models having long and narrow surface projections or other shapes which are difficult to exactly duplicate by conventional electroforming procedures because of the difficulty in rendering the female mold fully conductive to the full depth of the holes.

In another embodiment of the invention, metal articles are electroformed by making a male model of the article to be electroformed using a material possessing low surface adhesion properties; coating the male model with a conductive metallic coating; forming a female mold from a material having greater surface adhesion properties than the material of the male model by applying the mold material on the surface of the coated male model and then curing the mold material; transferring the conductive coating to the female mold by withdrawing the male model from the female mold; and electroforming the article in the metal-coated female mold.

It is to be understood that both the foregoing general description and the following detailed description are exemplary and explanatory but are not restrictive of the invention.

The accompanying drawings illustrate an example of a preferred embodiment of the invention, and together with the description, serve to explain the principles of the invention.

DETAILED DESCRIPTION OF THE INVENTION

Figure 1:
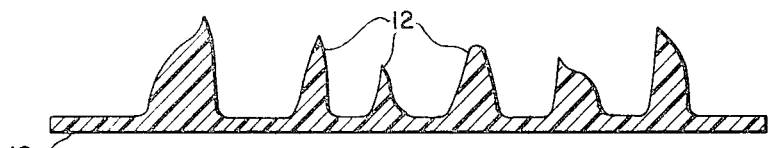
FIG. 1 is a cross-sectional view of a portion of a male model formed in accordance with the invention.

In accordance with the process of the invention, electroformed articles are obtained from a male model or original by first forming a conductive coating on the male model and subsequently forming a female electroforming mold from a mold material which is applied over the coated male model.

It is desirable that the male model be made of a material which possesses low surface adhesion properties. Suitable male model materials do not form strong chemical or mechanical bonds. These materials include a wide variety of saturated synthetic organic polymeric materials which possess a very low tendency to form chemical bonds at their surfaces, and which can be formed to present substantially non-porous surfaces which resist penetration by a layer of metallic material deposited thereon.

Particularly preferred male mold materials include saturated rubbers, and particularly silicone rubbers, saturated fluorocarbons, plastisols, urethanes, polyesters, and epoxies.

The invention can also be practiced by coating originals made of materials which have a somewhat greater capability of forming chemical bonds by coating the surface of the original with a parting agent such as graphite, metallic oxide, iodide, sulphide, or chromate in accordance with customary techniques.

In accordance with the process of this invention, the male model of the article to be electroformed is coated with a thin, physically-applied conduuctive coating. The coating may be applied by various physical techniques such as spraying, painting and dipping. Further, the initial conductive coating technique may include chemical reduction or vacuum evaporation of the physically-applied conductive coating material.

The thickness of the initial conductive coating is not critical, but must be thick enough to insure complete coverage of the male model and electrical conduction over its entire exposed surface. Two or more very thin coatings of conductive material may be applied with or without complete drying between coats. Typical, but not limiting, examples of conducting materials include gold, reduced silver, colloidal silver, carbon, and other conductive metals in powder or suspension form.

During the application of the thin conductive coating to the male model it is possible to insure complete coverage of projecting surfaces having a high depth to width ratio. On the other hand, it is often difficult or impossible to physically apply a uniform conductive coating to a female mold possessing indentations corresponding in dimensions to the projecting surfaces of the male mold.

Thus, the process of this invention is especially advantageous in electroforming articles, such as dies for stamping acoustical ceiling tile, which have a flat surface with a large number of surface projections that have a high depth to width ratio. The projections customarily are of a variety of lengths and are of irregular configuration, often pointed at their tips.

In accordance with the invention, a thin layer of metal is electroplated on the conductive coating. The electroplating step can be accomplished in a conventional manner by attaching the coated male model to a fixture, placing the male model in an electroplating tank as the cathode in an electrolyte solution, introducing direct current through an anode which consists of the metal to be deposited, and plating a thin layer of metal over the coated male model.

The constituents of the plating bath include a soluble compound of the metal to be deposited and will usually include ingredients to increase the electrical conductivity and the ability to produce coatings of uniform thickness on surfaces where the distances between various parts of the surface and the anode vary widely.

The deposited metal is preferably one which forms a hard, long-wearing coating, since this layer of metal forms the exterior surface of the electroformed article. Suitable metals for use in the electroplated layer include nickel, copper, and chromium. The thickness of the electroplated layer should be sufficient to prevent cracks or failures in the electroplated layer due to mechanical strain imposed during the steps subsequent to electroplating. However, it is desirable to limit the thickness of the electroplated layer to help insure conformity of the final finished article to the shape of the original. Typically, the electroplated layer of metal has a thickness of 0.002 to 0.010 in., with thicknesses of from 0.003 to 0.005 in. being preferred.

As used in the specification and claims the terms "electroplating" and "electroplated" are used in connection with the deposition of a thin layer of metal on the male model, and the terms "electroforming" and "electroformed" are used in connection with depositing metal on a mold surface.

After the electroplating of the thin layer of metal on the coated male model, the male model is removed from the electroplating tank and a female mold is formed on the electroplated male model by applying a mold material over the electroplated layer. The molding material preferably is a wax, but may be any thermoplastic or room temperature setting material which may easily be disposed of later. Typical materials which provide for ease in casting and later melting away or stripping off the female mold include butyrates, paraffin wax, beeswax, silicone rubbers, and urethanes.

Preferably, the mold material is cast in liquid form on the coated male model and is cured or hardened by cooling for a sufficient period of time to form a solid female mold. Preferably, the material is reclaimable or low in cost since the mold must be disposed of later.

The electroforming fixture is removed from the male model/mold assembly after the mold material has solidified. The male model is then removed from the female mold. Removal of the male model from the female mold can be easily accomplished, since, if the surface of the male model possesses low surface adhesion properties, or if a parting agent is used, the physically-applied conductive coating will not adhere to the male model. The thin layer of metal electroformed over the male model will remain on the female mold material and forms a uniform coating on the interior surfaces of the female mold.

In some embodiments of the process, the surface of the female mold is treated with an acid or other stripping agent to remove the physically-applied conductive coating that is present at the surface of the female mold. Removal of this conductive coating is not essential in all cases, but is ordinarily done because the conductive coating tends to act as a parting agent and could cause the delamination of the electroplated coating that is present on the surface of the female mold from the remainder of the article to be electroformed.

A variety of cleaning and stripping agents can be used to remove the conductive coating. The selection of a desired cleaning or stripping agent depends upon the nature of the conductive coating material selected, and the chemical resistance of the electroplated layer of metal. In general, strong mineral acids, such as sulfuric acid, are preferred.

The desired article is electroformed in the metal-coated female mold. The actual electroforming step can proceed in a conventional manner by first attaching the metal-coated female mold to a fixture, and then placing the fixture in a conventional electroforming tank. The detailed procedure and the bath used are preferably similar to the procedures and bath used in the electroplating step. The coating metal deposited in the mold in the electroforming tank must adhere to the electroplated layer so that this previously electroplated layer forms the surface of the desired article and the new electroformed layer forms the body of the article. Any metal that will adhere well to the electroplated surface layer of the female mold can thus be used in the electroforming step. Preferably, the melat deposited in the electroforming step is the same metal as was used to form the thin electroplated layer on the male model.

The thickness of the metal layer deposited during the electroforming step can vary widely depending upon the mechanical strength required of the electroformed article. If desired, the electroformed article can be reinforced by applying a reinforcing material in laminar form to the back of the article.

The mold material is then removed from the electroplated coating which adheres to the surface of the metal deposited during the electroforming step. The electroplated coating thus is an integral part of and forms the surface of the desired article. The mold material can be removed from the electroplated coating in various manners depending upon the nature of the material used to form the female mold. When the mold material is thermoplastic, it is desirable to first melt the thermoplastic material and then remove it from the electrodeposited coating by permitting the thermoplastic material to drain from the electroformed article. If a flexible room temperature curing mold material is used, such as silicone rubber, it can be simply stripped from the desired article.

The surface projections of the final article produced by the present embodiment of the invention are larger than those of the original male model by the sum of the thickness of the physically-applied conductive layer and the thickness of the electroplated layer of metal and thus the surface projections of the original male model should be made smaller than those desired on the final article. Because the female mold produced in the above process has a fully conductive coating, male articles having long, narrow projections may be successfully electroformed.

In another embodiment of the present invention, articles are electroformed from a full size male model of the article to be reproduced. In this embodiment, the material used in the male model is selected to possess low surface adhesion properties.

The male model is coated with a conductive coating, such as colloidal silver, which is physically applied by spraying, painting, dipping, or the like. A molding material, such as wax, polyurethane, epoxy, or polyester, that possesses greater surface adhesion properties than the male model is applied over the coated male model, and the molding material is cured to produce a solid female mold.

Subsequently, the male model is withdrawn from the female mold. The conductive coating is transferred from the male model to the female mold due to the greater surface adhesion properties of the female mold. Any crevices in the female mold which would be formed by projections at the surface of the male model are coated with the conductive material.

The electroforming process proceeds in a conventional manner and a metal is deposited on the conductive surface of the female mold.

Subsequently, the female mold is removed from the electroformed article. Frequently a portion of the conductive coating will remain on the surface of the article and may need to be cleaned off by etching with a chemical agent such as an acid.

In this embodiment of the invention, similar criteria are used for the selection of materials for the male model, the physically-applied conductive coating, and the female mold as are used in the preferred embodiment.

To illustrate the present invention more specifically, reference is now made to the specific example which follows. This example is merely illustrative and is not to be understood as limiting the scope and underlying principles of the invention.

Figure 2:
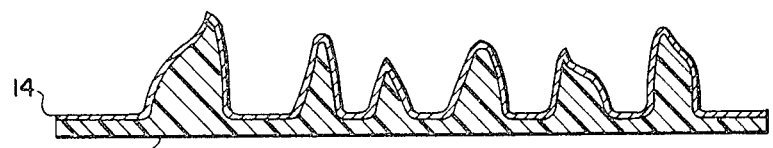
FIGS. 2, 3, 4, 5, and 6 are views similar to FIG. 1 which illustrate succeeding steps in the formation of an electroformed article in accordance with the invention.
Figure 3:
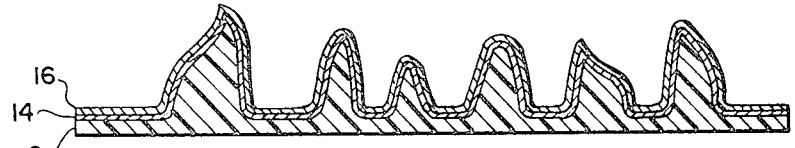
Figure 4:
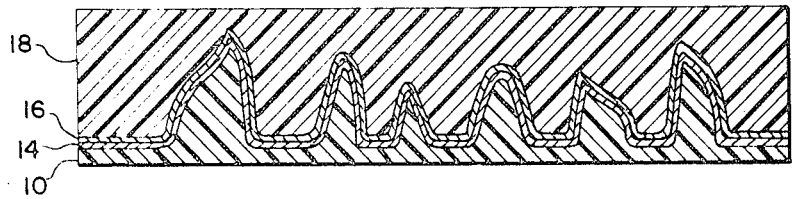
Figure 5:
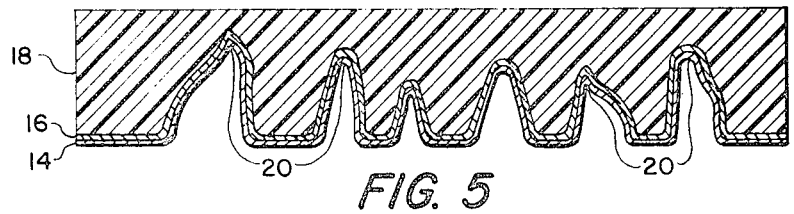

With reference to FIG. 1, a male model 10 is formed which has the general shape desired for a die for stamping acoustical tile. The model includes numerous projections 12 which are pointed and have a high depth to width ratio in the order of five to one. Male model 10 is made from a silicone rubber sold under the trade designation GE 631 Silicone Room Temperature Vulcanizate by the General Electric Co. The male model is then sprayed with collodial silver to produce a 0.001 inch conductive coating 14 as illustrated in FIG. 2. Subsequently, the coated male model is attached to a fixture and placed in an electro-plating tank containing a conventional electrolytic nickel plating bath including nickel sulfate, nickel chloride, boric acid and sulfuric acid. Direct current is introduced through a nickel anode to electrodeposit a 0.005 inch thick nickel coating 16, as illustrated in FIG. 3.

The male model is removed from the electroplating tank and female mold 18 is formed by pouring molten wax over the thin coating 16 of electroplated metal to completely cover the plated male model 10. After the wax has cooled sufficiently to solidify, male model 10 is removed from its fixture and is separated from female mold 18.

Thin coating 16 of nickel and coating 14 of colloidal silver are transferred to female mold 18 when the male model is removed due to the low surface adhesion of male model 10. Although female mold 18 contains deep crevices and fissures 20, corresponding to projections 12 of male model, these crevices and fissures are completely coated with conductive metal because the mold was formed around electrodeposited coating 16.

Figure 6:
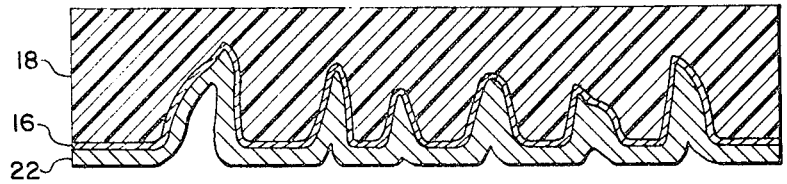

Subsequently, the coating at the surface of female mold 18 is treated with sulfuric acid to remove the colloidal silver, and to insure the adherence of the electroplated coating 16 to the material to be deposited in the electroforming step. The lower surface of female mold 18, after the cleaning step, is covered by electroplated coating 16 of nickel. Female mold 18 having coating 16 at its interior surface is attached to a fixture, placed in an electroforming tank, having the same composition as the above described electroplating tank, and nickel is electroformed into the mold to form an electroformed layer 22 as illustrated in FIG. 6 until the thickness of the electroformed layer reaches about 0.060 inch.

After completion of the electroforming step, female mold 18 is removed from the electroforming tank, and demounted from the fixture. The female mold 18 is removed from the electroformed article by melting and draining off the wax in an oven.

Figure 7:
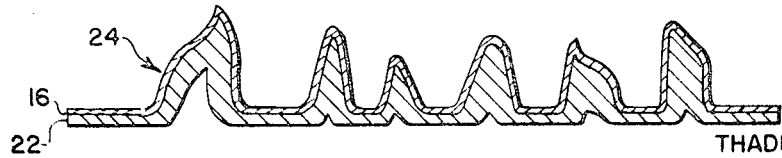
FIG. 7 is a cross-sectional view illustrating an electroformed article produced by the process of this invention.

As illustrated in FIG. 7, the finished die, generally 24 including electroplated coating 16 and electroformed layer 22, accurately reflects the high depth to width ratio surface projections of the male model. The die, when used as a stamping die for acoustical ceiling tile, shows no tendency to delaminate.

The invention in its broader aspects is not limited to the specific details shown and described and departures may be made from such details without departing from the principles of the invention.

What we claim is:

1. A process of making electroformed metal articles comprising:
   (a) making a male model of the article to be electroformed from a material possessing low surface adhesion properties, said male model including long, narrow surface projections;
   (b) coating the male model with a conductive metallic coating;
   (c) forming a female mold from a material having greater surface adhesion properties to said conductive metallic coating than the material of the male model by applying the mold material on the surface of the coated male model and then curing the mold material;

(d) transferring the conductive coating to the female mold by withdrawing the male model from the female mold; and (e) electroforming the article in the metal-coated female mold.

2. The process of claim 1 in which the male model is coated with a physically-applied silver coating.

3. The process of claim 1 in which step (b) comprises coating the male model with a physically-applied conductive coating, in which an electroplated coating layer is applied to the conductive coating, and in which the physically-applied conductive coating is stripped from the electroplated coating layer after the withdrawal of the male model from the female mold.

4. The process of claim 1 in which the male model is formed of a material selected from the group consisting of saturated rubbers, saturated fluorocarbons, silicone rubbers, plastisols, epoxies, and polyesters.

5. A process for making electroformed metal dies for use in producing acoustical products, said process comprising:

(a) coating a male model of an article to be electroformed with a thin conductive coating, said male model including long, narrow surface projections;

(b) electroplating a thin layer of metal on the conductive coating;

(c) forming a female mold from a mold material by applying the mold material over the electroplated male model and curing the mold material;

(d) withdrawing the male model from the female mold, leaving the electroplated layer and a majority of the thin layer of conductive coating on the female mold;

(e) electroforming the desired article in the metal coated female mold; and (f) removing the mold material from the surface of the desired article.

6. The process of claim 5 in which the mold material is thermoplastic, and is removed from the desired article by melting the mold material and draining it from the finished article.

7. The process of claim 5 including the step of stripping the conductive coating from the electroplated layer of metal prior to the electroforming step to leave a uniform electroplated metal surface on the interior of the female mold.

8. The process of claim 5 in which the dimensions of the desired article exceed the dimension to which the male model is formed by the combined thickness of the physically-applied conductive coating and the electroplated layer.

9. The process of claim 5 in which electroplated layer comprises 0.002 to 0.010 in. of a metal selected from the group consisting of nickel, copper, and chromium.

10. The process of claim 9 in which the thickness of the electroplated layer is from 0.003 to 0.005 inch.

11. The process of claim 5 in which the male model is formed of a material selected from the group consisting of saturated rubbers, saturated fluorocarbons, silicone rubbers, plastisols, epoxies, urethanes, and polyesters.

12. The process of claim 5 in which the surface projections of the male model have a depth to width ratio in the order of five to one.

References Cited

UNITED STATES PATENTS

| | | | |
|---|---|---|---|
| 836,646 | 11/1906 | Mac Donald | 204—5 |
| 1,448,792 | 3/1923 | Cole | 204—5 |
| 2,075,646 | 3/1937 | Hewitt | 204—5 |
| 3,424,635 | 1/1969 | Grandinetti et al. | 204—6 |
| 1,986,637 | 1/1935 | Hollier | 204—4 |
| 3,428,533 | 2/1969 | Pichel | 204—7 |
| 1,759,099 | 5/1930 | Dake | 204—7 |

JOHN H. MACK, Primary Examiner

T. TUFARIELLO, Assistant Examiner

U.S. Cl. X.R.

204—4